United States Patent [19]

Stone et al.

[11] Patent Number: 5,729,576
[45] Date of Patent: Mar. 17, 1998

[54] INTERFERENCE CANCELING RECEIVER

[75] Inventors: Wade J. Stone, New York, N.Y.;
Robert Tso, South San Gabrial; John M. Burns, Harbor City, both of Calif.

[73] Assignee: Hughes Electronics, Los Angeles, Calif.

[21] Appl. No.: 641,452

[22] Filed: Apr. 30, 1996

Related U.S. Application Data

[63] Continuation of Ser. No. 357,462, Dec. 16, 1994.
[51] Int. Cl.⁶ .............. H04L 27/14; H04B 1/10; H04B 15/04
[52] U.S. Cl. .............. 375/334; 375/350; 455/86; 455/312
[58] Field of Search .............. 375/221, 223, 375/334, 350; 455/86, 208, 307, 310, 312

[56] References Cited

U.S. PATENT DOCUMENTS

| | | | |
|---|---|---|---|
| 3,761,816 | 9/1973 | Condon | 375/334 |
| 4,425,665 | 1/1984 | Stauffer | 375/223 |
| 4,737,658 | 4/1988 | Kronmuller et al. | 455/216 |
| 5,052,027 | 9/1991 | Poklemba et al. | 455/307 |
| 5,101,370 | 3/1992 | Kingston et al. | 364/733 |
| 5,179,360 | 1/1993 | Suzuki | 455/86 |
| 5,188,117 | 2/1993 | Steinhaus et al. | 128/708 |
| 5,278,777 | 1/1994 | Cummins | 364/574 |
| 5,309,482 | 5/1994 | Wright et al. | 375/350 |
| 5,325,188 | 6/1994 | Scarpa | 375/350 |
| 5,373,246 | 12/1994 | Blomberg et al. | 375/334 |
| 5,400,084 | 3/1995 | Scarpa | 375/350 |

OTHER PUBLICATIONS

Couch, L.W., II, *Digital and Analog Communication Systems* (4th Ed.).
New York: MacMillan Publishing Company, 1993, pp. 551–553.

*Primary Examiner*—Stephen Chin
*Assistant Examiner*—Jeffrey W. Gluck
*Attorney, Agent, or Firm*—Leonard A. Alkov; Wanda K. Denson-Low

[57] ABSTRACT

A receiver used in a system having a transmitter (10) that sends an exciting signal to a remote transponder (18) is configured to receive a relatively weak signal from the transponder and to cancel out relatively high level interference from the transmission itself. A received frequency shift keying signal is fed to a tuned amplifier (22) for preliminary analog signal conditioning, and thence fed to an analog to digital converter (24). The output of the analog to digital converter is integrated (26) over a selected number of clock pulses and then dumped into a quarter rate quadrature demodulator (60) that multiplies the integrated signal by the same signal delayed by one clock interval. Undesired artifacts generated in the demodulator (60) are removed by a cascade of comb filters (70), and the demodulated digital output is available as the desired output of the receiver. The several clock signals of the system are all referenced from a basic exciter signal that itself gives rise to the transmitted interference signal so that the interference and all timing signals are approximately synchronous.

16 Claims, 3 Drawing Sheets

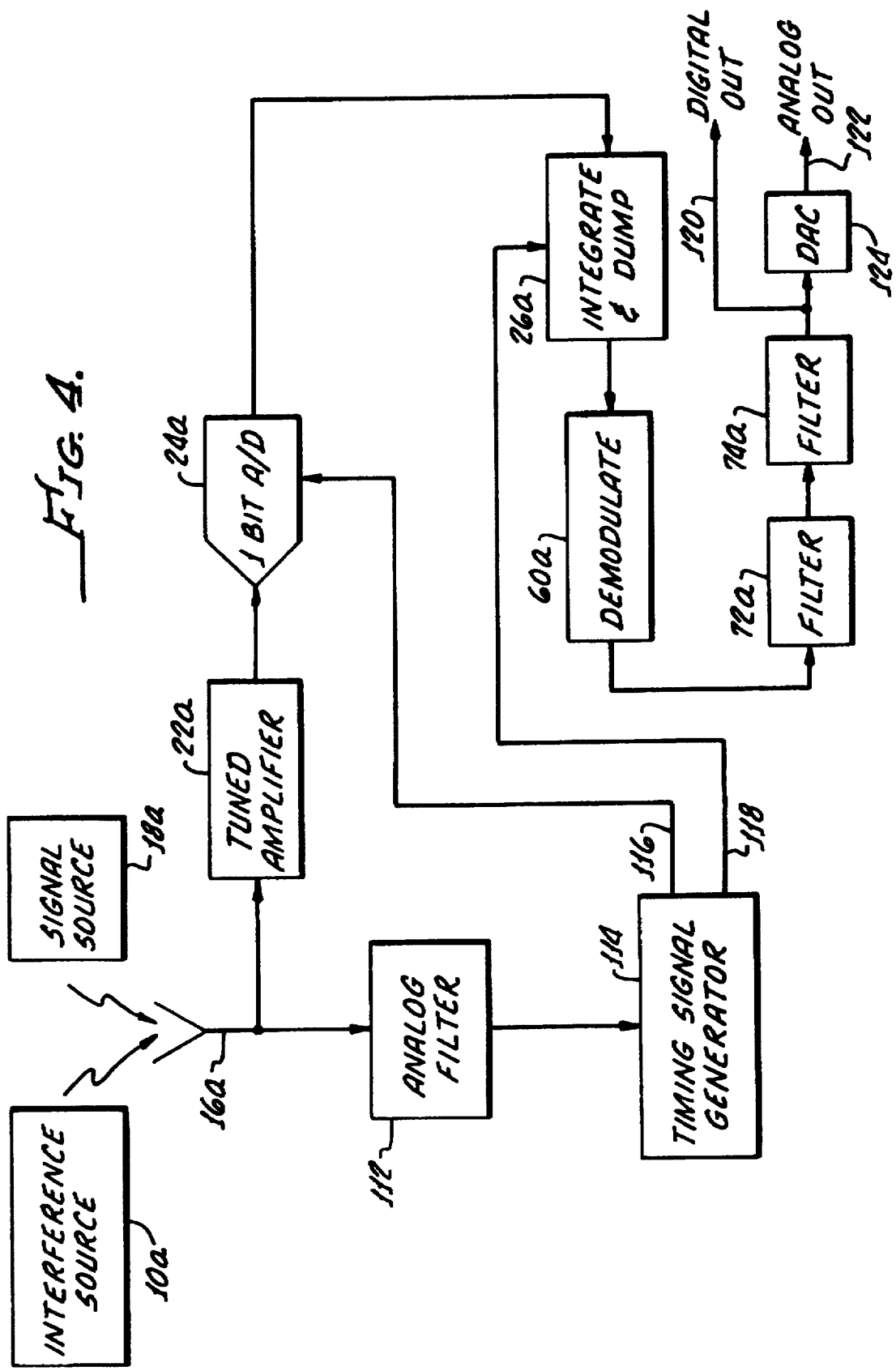

INTERFERENCE CANCELING RECEIVER

This is a continuation application Ser. No. 08/357,462, filed Dec. 16, 1994.

BACKGROUND OF THE INVENTION

1. Field of the Invention

The present invention relates to reception of signals in the presence of relatively high level interference, and more particularly concerns a simplified digital receiver having effective interference canceling characteristics.

2. Description of Related Art

Certain signal systems include both signal transmitters and receivers in which signal transmission, having significantly greater power than received information-bearing signals, causes high level interference that tends to mask the received signal. Even with those receivers in which a transmitted signal is not generated in the same equipment, strong interference signals may be generated from nearby sources. Both digital and analog signal processing techniques have been used to eliminate the high levels of interference as is required to properly process the received information-bearing signal.

Expensive analog signal conditioners include costly arrangements of narrow band tuned amplifiers and filters for rejection of high levels of interference signals.

Straightforward brute force digital implementation of a receiver having a wide dynamic range of analog to digital conversion may receive the interference as if it is a signal and further process received signals by digital channel isolation followed by FM demodulation utilizing a number of different algorithms. A system of this type is shown in U.S. Pat. No. 5,058,107 for Efficient Digital Frequency Division Multiplexed Signal Receiver of Wade J. Stone, Kikuo Ichiroku, Edwin A. Kelley and Don C. Devendorf (PD-88244). Such a system is of exceedingly high cost, embodies a relatively large volume of equipment, and may be unduly complicated. Effective interference cancelling receivers of simple construction and low cost have not been available.

Accordingly, it is an object of the present invention to provide for reception of a signal in the presence of a high level interference signal by a receiver that avoids or minimizes above-mentioned problems.

SUMMARY OF THE INVENTION

In carrying out principles of the present invention, in accordance with a preferred embodiment thereof, a signal receiver for receiving and demodulating a modulated information-bearing signal in the presence of an interference signal includes an analog signal conditioner having an input that receives both the information signal and an interference signal. An analog to digital converter converts the signal conditioner output to a digital signal at a first clock rate. The digital signal is integrated over a number of clock periods and then outputted to a demodulator that has an output representing the information carried by the original input signal. The output of the demodulator is fed through a simplified digital comb filter. For efficiency and low cost, the timing signals are essentially synchronous, being related to the frequency of the source of the interference signal.

BRIEF DESCRIPTION OF THE DRAWINGS

In the accompanying drawings:

FIG. 4 illustrates an alternate arrangement in which the interference signal is not locally generated.

DESCRIPTION OF PREFERRED EMBODIMENTS

Figure 1:
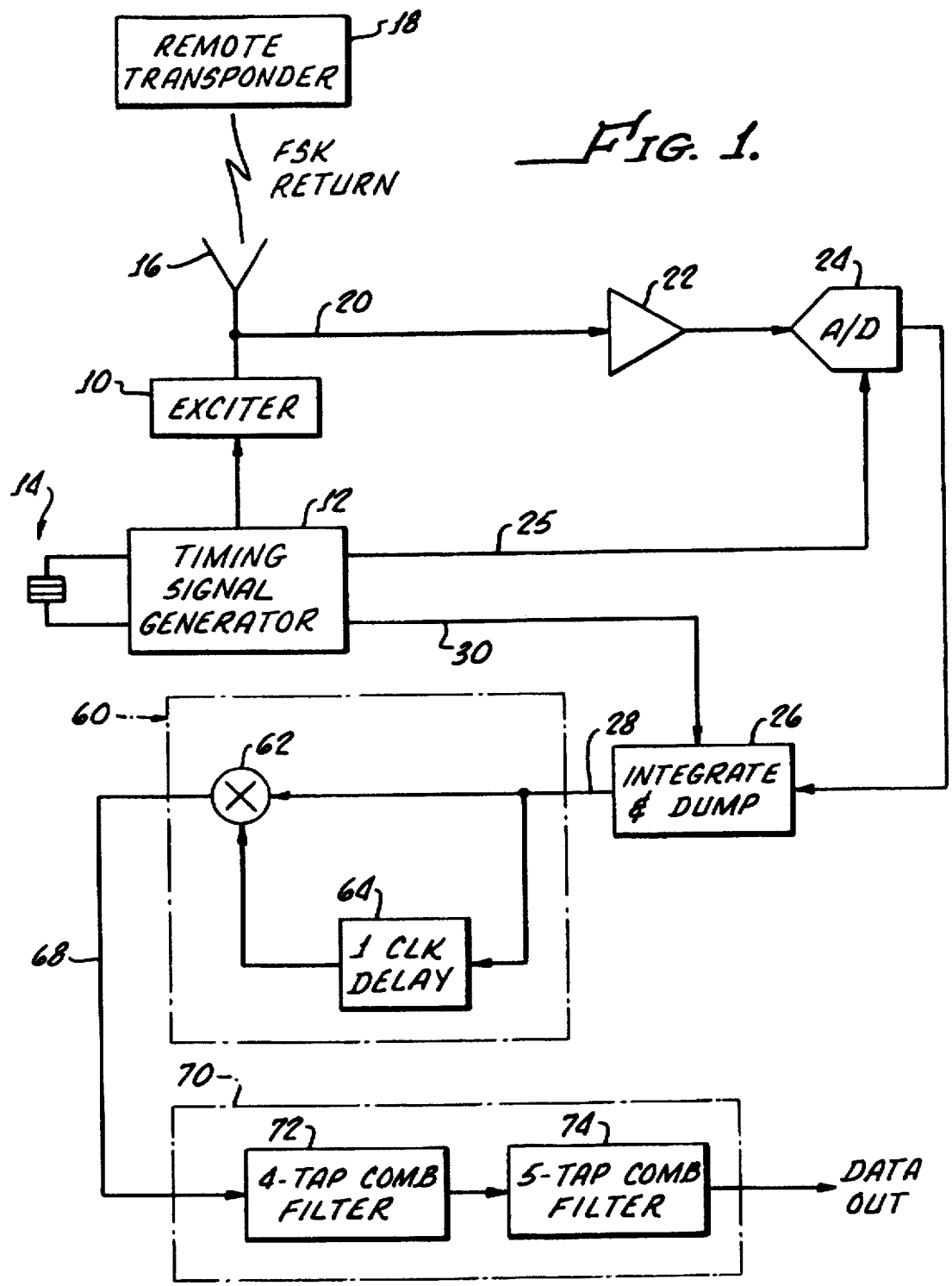
FIG. 1 is a block diagram of a receiver embodying principles of the present invention.

The present invention is useful for reception and demodulation of a wide variety of signals under a wide variety of conditions and applications. Thus, the received signal may be any combination of a frequency modulated signal source, having various signal characteristics (such as amplitude, carrier frequency, index of modulation, etc.) and including noise with the various characteristics of power density, bandwidth, probability density functions and spectral shape and the like, and an interference signal which is assumed to have some correlated, e.g., sinusoidal or non-random, behavior. The interference may or may not be internally generated by the system in which the receiver resides.

An embodiment of the present invention has been initially incorporated in the receiving circuitry of a transmit/receive system known as a Radio Frequency Identification System made by the Hughes Identification Devices, a subsidiary of Hughes Aircraft Company. Such systems include Hughes Procard® proximity identification cards and other radio frequency identification systems.

The invention will be described in connection with its use in such a transmit/receive system for purposes of exposition, although it will be understood that principles of the invention are applicable to a wide variety of other receiver systems in which reception of an information signal is impeded by presence of a high level interference signal. The exciter of one model of such a transmit/receive system generates a radio frequency signal at 125 kilohertz that is transmitted through relatively short distances to an identifying transponder carried by a remote device. The remote device, for example, may be a personal identification card incorporating a transponder that responds to and returns a card identifying reply to an exciter system that carries both the transmitter of the exciting signal and a receiver for demodulating the reply signal. The transponder receives the transmitted 125 kilohertz exciter signal, obtains power from the signal, and in return transmits a reply that identifies the transponder or an item to which it is affixed and/or certain other information which may be determined at the transponder. In this particular equipment the transponder employs divide by 8 and divide by 10 circuits to transmit its reply as a frequency shift keying (FSK) signal in which a digital 1 is represented by a tone at a first frequency of 15.625 kilohertz and a digital 0 by a tone at a second frequency of 12.5 kilohertz. The transmit/receive system itself includes receiving circuitry which is the subject of the present invention. It will be readily appreciated that the description of the invention in connection with this particular system is provided solely for purposes of exposition and that principles of the present invention may be applicable to many other applications, including cellular telephones, low cost multi-channel data communications equipment, wireless computer communication, and digitally modulated broadcast FM signals and the like.

FIG. 1 illustrates portions of an exciting system that may be used in the described Hughes Identification Devices equipment, including a transmitter or exciter 10 that is referenced from a timing signal generator 12 under control of an oscillator crystal 14 which oscillates, for example, at 4 megahertz. The 4 megahertz signal is divided down by the timing signal generator to provide the transmitted signal from the exciter at 125 kilohertz. This signal is sent from a transmit/receive antenna 16 of the system to be received by a remote transponder 18. The remote transponder may receive its power from the transmitted signal to energize its circuitry, and upon receipt of the transmitted signal assembles and returns a reply signal in the form of a FSK signal transmitted from the transponder for reception by the antenna 16 of the receiver. As previously mentioned, the reply signal from the transponder provides digital information in the form of a tone that shifts in frequency between 12.5 and 15.625 kilohertz. This FSK information-bearing signal is transmitted (by RF, inductive coupling or other means) to the antenna and then along a line 20 to an analog signal conditioner 22 that is formed by a tuned amplifier 22. A 125 kilohertz interference signal generated by exciter 10 is also received by the amplifier.

In a particular example, the interference signal is a single tone at 125 kilohertz and has about a 10 volt peak to peak amplitude at the input to amplifier 22. The FSK information signal is of much smaller amplitude, commonly about 120 dB smaller than the interference signal. Thus, the receiver must extract a relatively low level information signal from an interference signal having a very much higher amplitude.

The amplifier provides a narrow pass band substantially centered on the FSK frequencies, having a center at about 16 kilohertz. The amplifier provides a gain of about 60 dB for the FSK signal, and attenuates the interference signal by about 20 dB.

The output of the analog signal conditioner 22 is then fed to an analog to digital converter 24 of a conventional configuration. This converter may have any selected word size, dynamic range or linearity. In a specific example, for simplification of circuitry used with the FSK signal described herein, the converter is a 1 bit converter, having an output word size of 1 bit.

It is important that the analog to digital converter and all other clocked circuits of the receiver are clocked at rates that are referenced from and dependent upon the interference signal frequency. Stated otherwise, the clock rates are integer related to the interference signal frequency. They are either integral multiples of the interference frequency or are integral divisions of the interference frequency. In this particular system the interference signal is dependent upon the 4 megahertz crystal frequency of oscillator 14. Preferably the analog to digital converter 24 is clocked by a clock signal on line 25 from the timing signal generator at a frequency greater than or equal to, but effectively synchronous with and integer related to, the interference frequency. In this particular example the converter is clocked at the frequency of the crystal oscillator, 4 megahertz, which is an integral multiple of the interference frequency. This higher clock frequency enables a smaller word size, namely a 1 bit analog/digital converter to be employed.

The output of the converter 24 at the 4 megahertz clock rate is fed to an integrate and dump circuit 26. This circuit comprises a digital signal processing comb filter together with a 64 to 1 decimator and clocks its integrated signal out on a line 28 at a clock rate of 62.5 kilohertz, which is an integral division of both the 4 megahertz clock rate and the interference signal frequency. The integrate and dump circuit 26 is controlled by a 62.5 kilohertz clock signal (4 MHz÷64 and 125 kilohertz÷2) that is provided on a clock line 30 from timing signal generator 12 to provide its integrated output at each sixty fourth pulse of its input.

Figure 2:
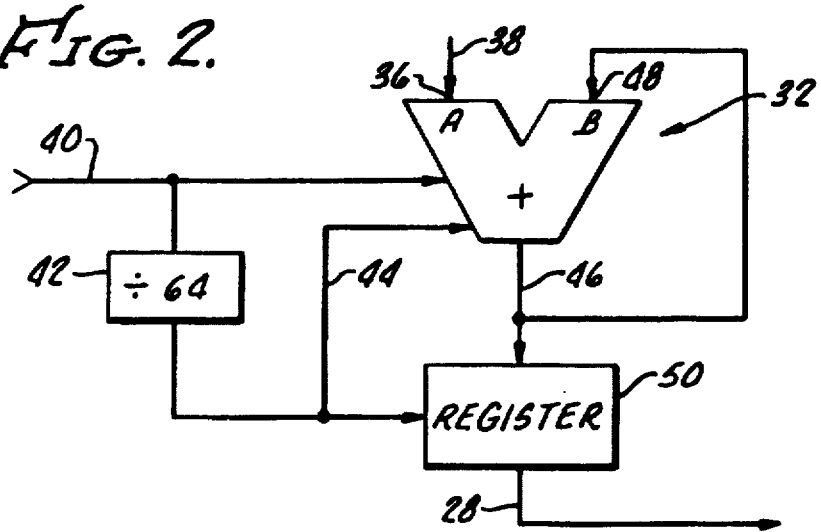
FIG. 2 is a block diagram of an integrate and dump circuit employed in the receiver of FIG. 1.

As can be seen in the block diagram of FIG. 2, the integrate and dump circuit 26 comprises an accumulator or adder 32 followed by a register 34. Adder 32 includes a first input port 36 that receives on line 38 the 1 bit output of analog to digital converter 24 at the 4 megahertz clock rate. Effectively, the accumulator adds successive signals over a predetermined number (sixty four in this example) of 4 MHz clock periods, and at the end of such predetermined number of clock periods dumps or reads out the sum. The accumulator 32 is clocked on a line 40 at the 4 megahertz clock rate, to thereby integrate the signal at that rate. Via a suitable divide circuit, such as a divide by 64 circuit 42, the 4 megahertz clock signal is used to generate to a 62.5 kilohertz signal on a line 44 that is employed to reset the accumulator, terminating each summing cycle and outputting the sum. During each summing cycle the output of the accumulator on a line 46 is fed back to a second input port 48 so that the sum then obtained (appearing at output 46) is combined with the next input at port 36. After the 64th accumulation, the accumulator output on line 46 is transferred to a 4 bit register 50, and the accumulator itself is reset so that the next sum over 64 clock intervals may be performed. The effect of the accumulator is to increase the size of the digital word to approximately 6 bits. In transfer to the register 50 the 2 least significant bits are eliminated, since truncation to a 4 bit word provides sufficient precision for the system. Effectively, by selecting every 64th pulse of the accumulator input, the 4 bit register 50 forms a decimator.

It will be seen that the integrate and dump circuit 26 basically comprises a digital signal processing comb filter which is generally the same as a FIR (finite impulse response) filter with 64 taps with each weighting coefficient equal to 1. A benefit of this type of filter is that transmission zeros are caused to occur at every integer multiple of the sampling frequency divided by the decimation ratio, i.e., a zero occurs at every N×62.5 kHz, N=1–64. Thus, in this arrangement one of the output zeros is centered precisely at 125 kilohertz, thereby providing an effective filtering notch for elimination of the 125 kilohertz interference frequency. The comb filter also acts to band limit noise.

Effectively, the integrate and dump circuit samples the comb filter output (accumulator output) and clears the accumulator every nth (actually 64th in this embodiment) clock of the analog/digital converter clock. Thus, the output sampling frequency of the integrate and dump circuit is 1/64th of the sampling frequency of the analog to digital converter. This integrate and dump circuit yields processing gain which is manifest in increase in word size. This provides a maximum growth to a 6 bit word, which, as previously mentioned, is truncated to a 4 bit word at register 50. Word size truncation to a 4 bit word is found to be acceptable in this receiver.

The output of the register 50 on line 28 is fed to a quarter rate quadrature demodulator, generally indicated at 60 (FIG. 1). The demodulator includes a multiplier 62 that directly receives the output on line 28 of the integrate and dump register 50. This output is also fed through a one clock delay 64 (which delays the signal by one pulse of the 62.5 kilohertz signal) of which the output is fed as a second input to the multiplier 62.

The frequency tone of interest of the information signal, namely the 15.625 kilohertz signal, is one quarter of the 62.5 kilohertz sampling frequency of the integrate and dump circuit 26. For reasonably small frequency deviations from the quarter sampling frequency (15.625 KHz in this embodiment) the phase to frequency transfer function of the single clock delay is approximately linear. Therefore, multiplying the signal by its nearly quadrature counterpart results in a signal that is approximately proportional in amplitude to the frequency deviation of the signal from the 15.625 kilohertz quarter sample frequency. Accordingly, multiplier 62 of the demodulator provides as an output on an output line 68 the demodulated signal from which the relatively large interference signal has been completely eliminated.

In the illustrated embodiment the quarter sampling frequency of 62.5 kilohertz is the input FSK tone frequency of 15.625 kilohertz. Accordingly, the result of the quarter rate quadrature demodulator is an amplitude value of 0 for the 15.625 kilohertz bit and some non-zero value for the 12.5 kilohertz bit. Again, the word size has been increased by the multiplier, but this can be truncated to a word size of 4 bits at the output of the multiplier.

The output of the quarter rate quadrature demodulator is fed to a digital signal processor filter 70 comprising a cascade of four tap comb filter 72 followed by a five tap comb filter 74. The purpose of the cascaded comb filters 72,74 is to remove artifacts that are generated by the demodulator. In the particular example described herein the demodulator produces two deviant frequency artifacts located specifically at 25 kilohertz and 31.25 kilohertz. Because, in the described embodiment, the FSK frequencies 12.5 and 15.625 kilohertz are derived from the 125 kilohertz exciter frequency, which in turn is derived from the 4 megahertz crystal frequency, and the 62.5 KHz sampling clock is also derived from the 4 MHz, the deviant frequency artifacts are also related to the 62.5 kilohertz sampling clock. Thus, a simplified filter architecture is employed, again using a simplified comb filter structure. The simplified comb filter structure is provided to position a null or notch at exactly 31.25 kilohertz and another notch at exactly 25 kilohertz, thus eliminating the 25 and 31.25 kilohertz artifacts. In this arrangement the cascade of two simplified comb filters effectively nulls both of the artifacts resulting from the quarter rate quadrature demodulator. In these filters no decimation step is needed.

Figure 3:
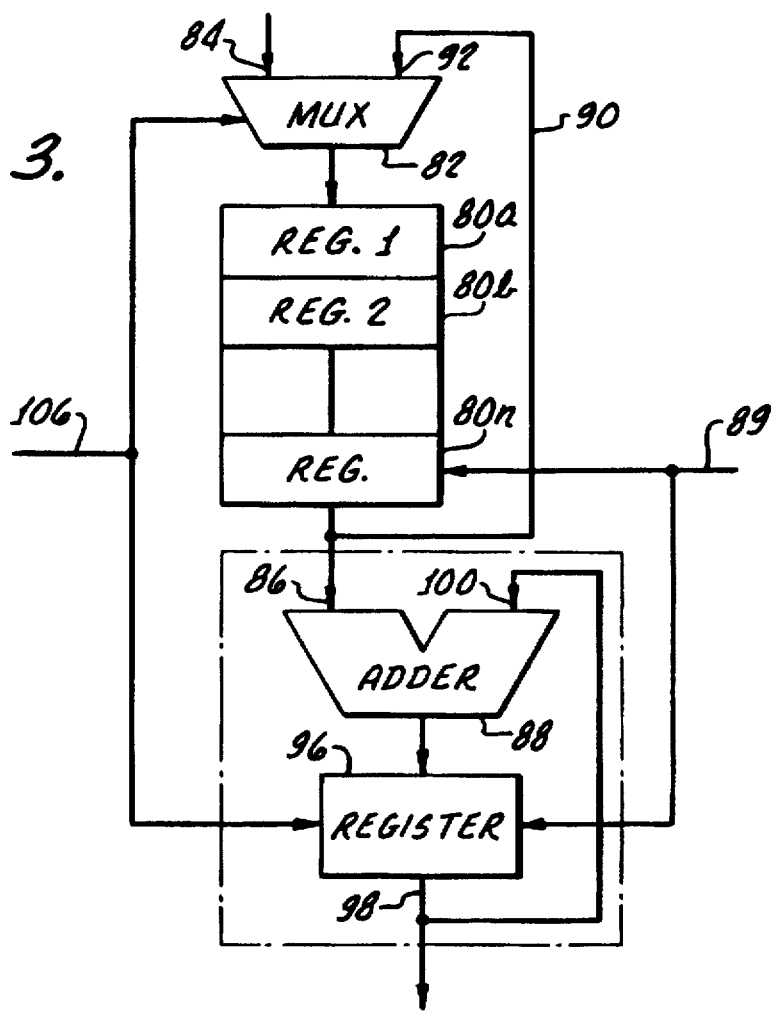
FIG. 3 illustrates an exemplary comb filter employed in the circuit of FIG. 1.

An exemplary comb filter that may be employed for each of filters 72 and 74 is illustrated in FIG. 3 as including a plurality of successive registers 80a, 80b, through 80n that are fed from the output of a multiplexer 82 that receives a first input signal on a line 84. The input signals are successively transmitted from one register to the other and from the nth register (80n) to a first input 86 of an adder 88 under control of a high speed processing clock applied via a line 89. The output of the last register, 80n, is also fed back via a line 90 to a second input terminal 92 of the multiplexer. The output of adder 88 is fed to a register 96, of which the output on a line 98 is fed back to a second input 100 of adder 88. The output of register 96 at line 98 also provides the filtered output of this comb filter. All registers are clocked by the high speed processing clock on line 89. This clock has a frequency of mf, where f is the frequency of input data on line 84 and m is the number of taps of this m tap filter. As previously mentioned in the case of filter 72, there are 4 taps, and there are 5 taps in the case of filter 74. A data rate clock on a line 106, in this case at a frequency of 62.5 kilohertz, is employed to clear the multiplexer and registers 80a through 80n and also to clear register 96.

The output of the second comb filter is demodulated FSK data which can readily be truncated to 1 bit so that the filter 70, which has a 4 bit word input, provides a 1 bit word as its output. This output can either be utilized in digital form or fed to a suitable digital to analog converter for use in analog form. The digital to analog converter (not shown in FIG. 1) will include any necessary analog anti-image filtering and further amplification as may be deemed necessary or desirable.

Importantly, as described above, all clock signals are synchronous or pseudo-synchronous, all being based upon and integer related to the master crystal oscillator 14. This is readily accomplished in the arrangement of FIG. 1, since the interference signal itself, produced by exciter 10, is also controlled by the same oscillator. For those situations in which the interference signal is non-locally generated, a similar basic synchronizing clock signal is derived from the dominant frequency of the interference signal itself. Thus, as illustrated in the modified embodiment shown in FIG. 4, the receiver antenna 16a receives an information bearing signal from a signal source 18a and a high level interference signal from an interference source 10a that is not part of the system in which the receiver resides. Except for the difference in the basic reference for all system timing, the receiver of FIG. 4 is the same as the receiver of FIG. 1. The signal from antenna 16a is fed to an analog filter 112 that effectively extracts a dominant frequency from the very high level interference signal and feeds this to a timing signal generator 114 that produces on lines 116 and 118, together with other lines (not shown), various integer related timing signals for the several components of the receiver. The remainder of the circuit is the same in this arrangement, with the combined interference and information bearing signal being fed to a tuned amplifier 22a and thence to an analog to digital converter 24a. The output of this converter is fed to an integrate and dump circuit 26a, and thence to a quarter rate quadrature demodulator 60a from which the output is fed through filters 72a,74a to provide a digital output on a line 120 or an analog output on a line 122 that is derived from a digital to analog converter 124, having an input from the second filter 74a.

In the arrangement of FIG. 4 all of the filters, demodulator, integrate and dump, analog to digital converter and tuned amplifier may be the same as are the corresponding circuits of FIG. 1. So, too, these elements of the system are all clocked from synchronous or integer related clock signals derived from the timing signal generator, which in turn is integer related to the dominant frequency of the interference signal. Just as the components of the receiver of FIG. 1 are all controlled from clock signals based upon the 125 kilohertz exciter signal frequency, the components of the receiver of FIG. 4 are all controlled from clock signals based upon the dominant frequency of the signal from interference source 10a.

What is claimed is:

1. A signal receiver for receiving and demodulating a modulated information bearing signal in the presence of an interference signal having a singular interference frequency comprising:

an analog signal conditioner having an input for receiving said modulated information bearing signal and said interference signal, and having an analog output;

an analog to digital converter responsive to said analog signal conditioner for converting said analog output to a digital signal having a series of digital words transmitted at a first clock rate;

an integrating digital signal processor responsive to said analog to digital converter for repetitively integrating a predetermined number of words of said digital signal to provide an integrated digital signal having a series of integrated digital words transmitted at a second clock rate that is lower than said first clock rate, said first and second clock rates both being integer related to said singular interference frequency of said interference signal, wherein a transmission zero is caused to occur at the singular interference frequency;

demodulator means for demodulating said integrated digital signal;

means for determining said singular interference frequency of the interference signal; and means for adjusting the first clock rate in integer proportion to said singular interference frequency.

2. The signal receiver of claim 1 wherein said information bearing signal is an FSK signal shifting between first and second frequencies that are derived from said known interference frequency.

3. The signal receiver of claim 1 wherein said information bearing signal is an FSK signal shifting between first and second information frequencies and wherein said known interference frequency of said interference signal is an integer multiple of each of said information frequencies.

4. The receiver of claim 1 wherein said analog to digital converter is a one-bit ADC, and wherein said integrating digital signal processor means performs an integrate and dump.

5. A signal receiver for receiving and demodulating a modulated information-bearing signal in the presence of a singular interference signal having an interference frequency integer related to the frequency of said information-bearing signal, said signal receiver comprising:

an analog signal conditioner having an input for receiving both said information-bearing signal and said interference signal, and having an analog output including an amplified information-bearing signal and an attenuated interference signal;

an analog-to-digital converter receiving said analog output and responsively providing a digital signal having a series of digital words at a first clock rate which is an integer multiple of said interference frequency;

an integrating digital signal processor receiving said series of digital words of said digital signal at said first clock rate for repetitively integrating a predetermined number of said digital words to provide an integrated digital signal at a second clock rate which is lower than said first clock rate by an integer divisor equal to said predetermined number, so that a transmission zero occurs at said singular interference frequency;

demodulator means for demodulating said integrated digital signal;

means for determining said singular interference frequency of the interference signal; and means for setting said first clock rate at an integer multiple equal to said predetermined number multiplied by said singular interference frequency.

6. The signal receiver of claim 5 further including exciter signal transmitter means for providing an exciter signal, and wherein said singular interference signal frequency is generated by said exciter signal transmitter means.

7. The signal receiver of claim 5 wherein both said first clock rate and said second clock rate are synchronous with said singular interference frequency.

8. The signal receiver of claim 5 wherein said demodulator means comprises a multiplier having a first input receiving said integrated digital signal at said second clock rate, and also receiving at a second input a delayed integrated digital signal which is delayed by one clock rate interval relative to said integrated digital signal, said delayed integrated digital signal being provided by a delay circuit having an input receiving said integrated digital signal from said integrating digital signal processor and providing a single clock delay at said second clock rate to provide said delayed integrated digital signal, said delay circuit having an output connected to said multiplier second input, and said multiplier providing a demodulated signal.

9. The signal receiver of claim 5 further including a comb filter receiving said demodulated signal for filtering signal artifacts generated by said demodulator.

10. The signal receiver of claim 9 wherein said comb filter includes multiple taps equal in number to an integer multiple of said predetermined number so that transmission zeros are also caused to occur at frequencies equal to said singular interference frequency divided by said predetermined number.

11. The signal receiver of claim 9 wherein said comb filter includes a plurality of successive registers each fed an output from a multiplier receiving said demodulated signal.

12. The signal receiver of claim 11 wherein said multiplier also receives an input from a last-successive one of said plurality of successive registers.

13. The signal receiver of claim 12 further including a high-speed clock having a frequency "mf" in which "f" is the frequency of said demodulated signal and "m" is the number of said multiple taps, and wherein said comb filter further includes an adder receiving an output from said last-successive one of said plurality of successive registers and also receiving an output from another register, said another register receiving an input from said adder and being clocked by said high-speed clock.

14. The signal receiver of claim 13 wherein said plurality of successive registers are clocked by a data rate clock at a frequency which is integer related to said singular interference frequency.

15. The signal receiver of claim 14 wherein said data rate clock is also employed to clear said plurality of successive registers at a rate which is integer related to said singular interference frequency.

16. The signal receiver of claim 5 wherein said information-bearing signal is an FSK signal shifting between first and second frequencies that are derived by integer division from said singular interference frequency.

* * * * *